UNITED STATES PATENT OFFICE 2,165,530

FAT-HARDENING PROCESS

Simon Hendrik Bertram, The Hague, Netherlands, assignor, by mesne assignments, to N. V. Industrieele Exploitatie Maatschappij, The Hague, Netherlands No Drawing. Application August 30, 1935, Serial No. 38,537. In the Netherlands September 5, 1934

10 Claims. (Cl. 260—398)

My invention relates to the art of fat-hardening, i. e., the conversion of oils, fats and fatty acids into normally solid compounds with higher setting points.

The invention provides means for effecting this conversion in a simpler manner and at less costs than was hitherto possible.

Hitherto the conversion of normally liquid compounds of the fatty series into solids has been practised in two ways, only one of which has found wide-spread adoption, viz., by hydrogenation with or without pressure in the presence of a catalyst and, alternatively, by elaidination, i. e., by the conversion of the acid radicles of the oleic acid series into their geometrical isomerides, in the case of oleic acid itself into elaidic acid. As compared with polymerization, the molecular weight, iodine value and optical activity are practically not changed by elaidination.

While the process of hydrogenation has created a new wide-spread industry, the elaidination process has scarcely been adopted in actual practice. According to this process the oils to be so converted have been acted upon with oxidants such as nitrous vapors or mixtures developing same, which include a mixture of mercury and nitric acid, of sulfur dioxide and nitric acid or of potassium nitrite and glacial acetic acid.

Another way of effecting this conversion has been the treatment of the oils with a concentrated solution of $NaHSO_3$ (at 175° C.) or a solution of $SO_2$ (at 200° C.) or of phosphorous acid, also at a high temperature. Elemental sulfur has also been used as a catalyst in this conversion.

All these conversion methods, those using oxidants and those, in which sulfur or phosphorus appear to act as catalysts, involve certain drawbacks which prevented their practical adoption; in all these processes the conversion does not proceed easily to the end, so that the yield is unsatisfactory. Moreover byproducts are formed which can be removed, if at all, only with great difficulties and the final products of conversion were far inferior as regards color, smell, and taste, to the products obtainable by hydrogenation.

I have now found means whereby the process of conversion of oleic acid and its homologues into the geometrical isomeric, elaidic acid and its homologues can be carried through in a very simple and efficacious manner without the formation of any undesirable byproducts and with an almost theoretical yield. In fact the products thus obtained after refining are equal, as far as color, smell and taste are concerned, to the best products nowadays obtainable by way of hydrogenation and the process of preparing same is superior to the hydrogenation process in that it can be carried through at normal atmospheric pressure and does not require the provision of hydrogen. The catalysts which I use are low-priced, readily available substances.

I have found that the conversion of oils, fats and fatty acids into free elaidic acid or the esters of this acid proceeds rapidly and with an almost theoretical yield in the presence of selenium, either in elemental form or in the form of a selenium compound.

I have further found that tellurium will act similarly to selenium and that mixtures of selenium and tellurium will be equally effective.

I have also found that the elements (selenium and tellurium) need not be present in chemically or technically pure condition, but that in their crude forms they exert an equal or even better action on the materials under treatment.

Apart from elemental selenium or tellurium I may also use with advantage their oxides, hydrides, halides or other compounds and also their alloys.

A very small quantity of elemental selenium or tellurium or one of its compounds or alloys need only be present in the conversion.

I have found a temperature ranging between 140 and 240° C. to be advantageous for the conversion process.

I have further found that while the process may be carried through with full success under atmospheric pressure, a pressure above atmospheric may in certain cases be beneficial in promoting the conversion of oleic acid into elaidic acid. If the operation is carried through at a pressure below atmospheric, the yield of elaidic acid may be somewhat lower, but the byproducts, if such are formed, are lighter in color.

As usual with catalysts, the activity of the elements selenium and tellurium and of their compounds and alloys rises in proportion to the degree of subdivision and the distribution of the finely divided catalyst on a carrier substance may be useful.

The results obtainable according to this invention, as compared with the use of elemental sulfur as catalyst, are demonstrated by way of example by the figures given in the schedules hereunder, which relate to the conversion of technical and of pure olein, respectively, into elaidic acid.

Technical olein $n_D$ 60°=1.4480

| Catalyst | Quantity in percent | Time in hours | Temperature in °C. | Percent elaidic acid formed | $n_D$ 60° | color |
|---|---|---|---|---|---|---|
| Flowers of sulfur | 1 | 3 | 215–220 | 12.5 | 1.4510 | dark. |
| Do | 1 | 4½ | 220 | 13.5 | | Dark. |
| Crude metallic Se. | 1 | 3 | 215–220 | 34.0 | 1.4488 | light. |
| Do | 0.1 | ½ | 220 | 13.0 | | Light. |
| Do | 0.1 | 2 | 220 | 23.5 | | Do. |
| Do | 0.1 | 3 | 220 | 23.0 | | Do. |
| Do | 0.1 | 5 | 220 | 33.0 | | Do. |
| Do | 0.1 | 7 | 220 | 32.5 | 1.4478 | light. |
| Red pure Se powder. | 0.3 | 5 | 220 | 26.0 | | Very light. |
| Te (crude) | 0.2 | 1 | 180 | 35.0 | | Do. |
| SeBr$_2$ | 0.5 | 3 | 210 | 32.0 | | Light. |
| SeO$_2$ | 1 | 2 | 240 | 30.0 | | |
| SeSn | 0.3 | 2 | 230 | 35.0 | | |

Pure olein

| | | | | | | |
|---|---|---|---|---|---|---|
| Se (gray powder). | 0.1 | 8 | 200 | 55.0 | | Very light. |
| Do | 0.2 | 3 | 200 | 65.0 | | Do. |
| Do | 0.3 | 1 | 240 | 70.0 | | Do. |
| Do | 0.3 | 8 | 180 | 67.0 | | Do. |
| Do | 0.3 | 30 | 140 | 66.0 | | Do. |
| SeH$_2$ | 0.5 | 1 | 230 | 60.0 | | Do. |

The above figures show that the pure selenium metal is less effective than the crude metal.

Similar tests carried out, instead of oleic acid with arachis oil, gave the following results:

When arachis oil was heated with 0.3% by weight of gray powdered Se at 200° C. for two hours, the oil became solid with a clear melting point of 32° C.

When palmoil was treated with the catalysts here in view, the following figures were obtained:

Crude palmoil with a setting point of 26° C. was heated with 0.05% Se (red powder) at 210° C. for 3 hours. The solid elaidinated palmoil resulting in this treatment was hard and brittle and showed a setting point of 35° C.

The results of the treatment of castor oil in accordance with this invention were the following:

Castor oil heated with 0.3% gray crude Se at 200° C. for 3 hours solidified at room temperature and showed a clear melting point of about 45° C. The iodine value and optical activity were not changed by this treatment.

The above shows that selenium, tellurium and their compounds and alloys are far superior, as regards catalytic efficiency, yield and qualities of the final products obtainable, to sulfur and phosphorus, to say nothing of the various oxidants hitherto suggested for this reaction.

As compared with the hydrogenation process, the method according to this invention offers the great advantage of dispensing altogether with hydrogen and therefore requiring a far less costly installation. In view of the low costs of the catalysts which need be present only in very small quantities, the economical advantage of this process renders it superior to the hydrogenation process.

Various changes may be made in the details disclosed in the foregoing specification without departing from the invention or sacrificing the advantages thereof.

I claim:

1. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of a metal of the selenium group.

2. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of elemental selenium.

3. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of crude elemental selenium.

4. The method of converting the compounds of the group consisting of oleic acid, olein, and their homologues into compounds which are solid at normal temperature, and show a higher setting point, while molecular weight, iodine value and optical activity are practically not changed, which comprises heating the materials to be treated at least one hour to a temperature ranging between 140 and 240° C. in the presence of a small quantity of a selenium compound.

5. The method of converting the compounds of the group consisting of oleic acid, olein and their homologues into compounds which are solid at normal temperature, and show a higher setting point, while molecular weight, iodine value and optical activity are practically not changed, which comprises heating the materials to be treated at least one hour to a temperature ranging between 140 and 240° C. in the presence of a small quantity of a selenium alloy.

6. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of elemental tellurium.

7. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of a tellurium compound.

8. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of a tellurium alloy.

9. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a small quantity of selenium and tellurium.

10. The method of converting the compounds of the group consisting of oleic acid, olein and their homologues into compounds which are solid at normal temperature and show a higher setting point, while molecular weight, iodine value and optical activity are practically not changed, which comprises heating the materials to be treated at least one hour to a temperature ranging between 140 and 240° C. in the presence of a metal of the selenium group finely distributed on a carrier substance.

SIMON HENDRIK BERTRAM.